US012606148B2

(12) United States Patent
Ourabah

(10) Patent No.: US 12,606,148 B2
(45) Date of Patent: Apr. 21, 2026

(54) METHOD FOR CALCULATING A MANAGEMENT SETPOINT FOR THE COMSUMPTION OF FUEL AND ELECTRIC CURRENT BY A HYBRID MOTOR VEHICLE

(71) Applicant: Renault s.a.s., Boulogne-Billancourt (FR)

(72) Inventor: Abdel-Djalil Ourabah, Paris (FR)

(73) Assignee: Renault s.a.s., Boulogne-Billancourt (FR)

( * ) Notice: Subject to any disclaimer, the term of this patent is extended or adjusted under 35 U.S.C. 154(b) by 87 days.

(21) Appl. No.: 18/587,447

(22) Filed: Feb. 26, 2024

(65) Prior Publication Data

US 2024/0278765 A1 Aug. 22, 2024

Related U.S. Application Data

(63) Continuation of application No. 17/278,510, filed as application No. PCT/EP2019/075449 on Sep. 23, 2019, now abandoned.

(30) Foreign Application Priority Data

Sep. 25, 2018 (FR) ...................................... 18 58734

(51) Int. Cl.
*B60W 10/08* (2006.01)
*B60W 10/06* (2006.01)
(Continued)

(52) U.S. Cl.
CPC ............ *B60W 10/08* (2013.01); *B60W 10/06* (2013.01); *B60W 10/26* (2013.01); *B60W 20/12* (2016.01);
(Continued)

(58) Field of Classification Search
CPC ...... B60W 10/08; B60W 10/06; B60W 10/26; B60W 20/12; B60W 20/13;
(Continued)

(56) References Cited

U.S. PATENT DOCUMENTS

2011/0288712 A1 11/2011 Wang et al.
2017/0151884 A1 6/2017 Khosravi et al.
(Continued)

FOREIGN PATENT DOCUMENTS

DE 10 2013 225 558 A1 6/2015
EP 2 857 271 A2 4/2015
(Continued)

OTHER PUBLICATIONS

International Search Report issued on Nov. 5, 2019 in PCT/EP2019/075449 filed on Sep. 23, 2019, 2 pages.
(Continued)

*Primary Examiner* — Brian P Sweeney
(74) *Attorney, Agent, or Firm* — Oblon, McClelland, Maier & Neustadt, L.L.P.

(57) ABSTRACT

A method is for calculating a management setpoint for the consumption of fuel and of electric current by a hybrid motor vehicle including at least one electric motor that is supplied with electric current by a traction battery and an internal combustion engine that runs on fuel. The method includes: dividing a journey into segments; acquiring attributes for each segment; for each segment, acquiring a relationship between the fuel and electrical consumption; determining an optimal consumption point in each acquired relationship to maximize discharging the traction battery over the segments for which use of the internal combustion engine is not authorized, minimize the fuel consumption of the hybrid motor vehicle over the entire journey, and maximize the discharging of the traction battery upon completion (Continued)

| T1 | | T2 | | T3 | | ... | TN | |
|---|---|---|---|---|---|---|---|---|
| Attribute | Value | Attribute | Value | Attribute | Value | | Attribute | Value |
| FC | 2 | FC | 3 | FC | 6 | | FC | 1 |
| SC | 5 | SC | 4 | SC | 1 | | SC | 6 |
| SL | 70 km/h | SL | 60 km/h | SL | 130 km/h | | SL | 30 km/h |
| TS | 43 km/h | TS | 74 km/h | TS | 97 km/h | | TS | 35 km/h |
| RG | 3% | RG | -5% | RG | 0% | | RG | 0% |
| LL | 12 km | LL | 8 km | LL | 29 km | | LL | 1 km | of the journey; and developing a setpoint for power management over the entire journey, according to the coordinates of the optimal points.

7 Claims, 3 Drawing Sheets

(51) Int. Cl.
| | |
|---|---|
| *B60W 10/26* | (2006.01) |
| *B60W 20/12* | (2016.01) |
| *B60W 20/13* | (2016.01) |
| *B60W 50/00* | (2006.01) |

(52) U.S. Cl.
CPC ........ *B60W 20/13* (2016.01); *B60W 50/0097* (2013.01); *B60W 2050/0013* (2013.01); *B60W 2510/244* (2013.01); *B60W 2552/05* (2020.02); *B60W 2552/15* (2020.02); *B60W 2555/60* (2020.02); *B60W 2556/50* (2020.02); *B60W 2710/244* (2013.01); *B60Y 2200/92* (2013.01)

(58) Field of Classification Search
CPC ..... B60W 50/0097; B60W 2050/0013; B60W 2510/244; B60W 2552/05; B60W 2552/15; B60W 2555/60; B60W 2556/50; B60W 2710/244; B60W 2050/0025; B60W 2050/0026; B60W 2050/0075; B60W 2510/0623; B60W 2552/20; B60W 2552/30; B60W 2556/10; B60Y 2200/92; Y02T 10/40; Y02T 10/62; Y02T 10/84; Y04S 10/126
See application file for complete search history.

(56) References Cited

U.S. PATENT DOCUMENTS

| | | | |
|---|---|---|---|
| 2018/0281620 A1 | 10/2018 | Ourabah et al. | |
| 2019/0322267 A1 | 10/2019 | Kurihashi | |
| 2019/0344775 A1 | 11/2019 | Ourabah et al. | |
| 2019/0344777 A1 | 11/2019 | Ourabah et al. | |

FOREIGN PATENT DOCUMENTS

| | | | |
|---|---|---|---|
| EP | 2857271 B1 * | 4/2015 | |
| FR | 3 061 470 A1 | 7/2018 | |

OTHER PUBLICATIONS

M. Karmakar and A. K. Nandi, "Trip planning for electric vehicle through optimal driving using genetic algorithm," 2016 IEEE 1st International Conference on Power Electronics, Intelligent Control and Energy Systems (ICPEICES), Delhi, India, 2016, pp. 1-6, doi: 10.1109/ICPEICES.2016.7853336. (Year: 2016).
Liang Li, Liyan Zhou, Chao Yang, Rui Xiong, Sixiong You, Zongqi Han, "A novel combinatorial optimization algorithm for energy management strategy of plug-in hybrid electric vehicle," 2017, pp. 6588-6609, https://doi.org/10.1016/j.jfranklin.2017.08.020. (Year: 2017).

* cited by examiner

FIG. 1

| T1 | | T2 | | T3 | | ... | TN | |
|---|---|---|---|---|---|---|---|---|
| Attribute | Value | Attribute | Value | Attribute | Value | | Attribute | Value |
| FC | 2 | FC | 3 | FC | 6 | | FC | 1 |
| SC | 5 | SC | 4 | SC | 1 | | SC | 6 |
| SL | 70 km/h | SL | 60 km/h | SL | 130 km/h | | SL | 30 km/h |
| TS | 43 km/h | TS | 74 km/h | TS | 97 km/h | | TS | 35 km/h |
| RG | 3% | RG | -5% | RG | 0% | | RG | 0% |
| LL | 12 km | LL | 8 km | LL | 29 km | | LL | 1 km |

FIG. 2

| T1 | T2 | T3 | ... | TN |
|---|---|---|---|---|
| | | | | |
| $\psi_{2,1}$ | $\psi_{2,2}$ | $\psi_{2,3}$ | | $\psi_{2,N}$ |
| $\psi_{1,1}$ | $\psi_{1,2}$ | $\psi_{1,3}$ | | $\psi_{1,N}$ |
| $\psi_{0,1}$ | $\psi_{0,2}$ | $\psi_{0,3}$ | | $\psi_{0,N}$ |
| $\Delta SoEmin_1$ | $\Delta SoEmin_2$ | $\Delta SoEmin_3$ | | $\Delta SoEmin_N$ |
| $\Delta SoEmax_1$ | $\Delta SoEmax_2$ | $\Delta SoEmax_3$ | | $\Delta SoEmax_N$ |
| $RG_1$ | $RG_2$ | $RG_3$ | | $RG_N$ |
| $LL_1$ | $LL_2$ | $LL_3$ | | $LL_N$ |

FIG. 3

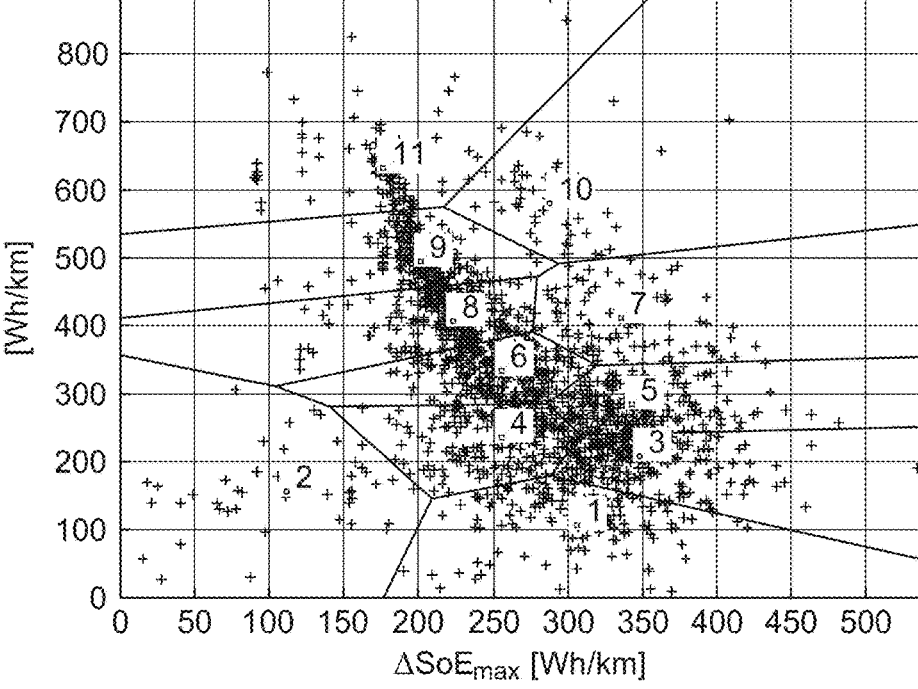

X-axis: ΔSoE [Wh/km]
Y-axis: CC [/km]

| Attribute Name | Value | $CE_1$ | $CE_2$ | $CE_3$ | $CE_4$ | ... | $CE_{11}$ |
|---|---|---|---|---|---|---|---|
| FC | 1 | | | | | | |
| FC | 2 | $a_1$ | $a_2$ | $a_3$ | $a_4$ | ... | $a_{11}$ |
| FC | ... | | | | | | |
| FC | 6 | | | | | | |
| SC | 1 | | | | | | |
| SC | 2 | | | | | | |
| SC | ... | | | | | | |
| SC | 6 | $b_1$ | $b_2$ | $b_3$ | $b_4$ | ... | $b_{11}$ |
| SL | 30 | $c_1$ | $c_2$ | $c_3$ | $c_4$ | ... | $c_{11}$ |
| SL | ... | | | | | | |
| SL | 130 | | | | | | |
| NL | 1 | | | | | | |
| NL | 2 | $d_1$ | $d_2$ | $d_3$ | $d_4$ | ... | $d_{11}$ |
| NL | ≥3 | | | | | | |
| SMS | <20 | | | | | | |
| SMS | 20-40 | | | | | | |
| SMS | 40-60 | | | | | | |
| SMS | 60-80 | $e_1$ | $e_2$ | $e_3$ | $e_4$ | ... | $e_{11}$ |
| SMS | 80-100 | | | | | | |
| SMS | >100 | | | | | | |
| TS | <20 | | | | | | |
| TS | 20-40 | | | | | | |
| TS | 40-60 | $f_1$ | $f_2$ | $f_3$ | $f_4$ | ... | $f_{11}$ |
| TS | 60-80 | | | | | | |
| TS | 80-100 | | | | | | |
| TS | >100 | | | | | | |

TAB

METHOD FOR CALCULATING A MANAGEMENT SETPOINT FOR THE COMSUMPTION OF FUEL AND ELECTRIC CURRENT BY A HYBRID MOTOR VEHICLE

CROSS-REFERENCE TO RELATED APPLICATIONS

The present application is a continuation of and claims priority under 35 U.S.C. § 120 to U.S. application Ser. No. 17/278,510, filed Mar. 22, 2021, the entire contents and disclosure of which is incorporated by reference herein. U.S. application Ser. No. 17/278,510 is a 371 of PCT/EP2019/075449, filed Sep. 23, 2019, which claimed priority to French Patent Application No. 1858734, filed Sep. 25, 2018.

TECHNICAL FIELD TO WHICH THE INVENTION RELATES

The present invention relates generally to rechargeable hybrid vehicles.

It relates more particularly to a method for calculating a management setpoint for the consumption of fuel and electric current by a hybrid motor vehicle comprising at least one electric motor supplied with electric current by a traction battery, and an internal combustion engine supplied with fuel.

The invention is particularly advantageously applicable to hybrid vehicles with great electrical range, that is to say vehicles likely to run using just their electric motor over a distance greater than 10 kilometers.

TECHNOLOGICAL BACKGROUND

A rechargeable hybrid vehicle comprises a conventional thermal traction chain (with an internal combustion engine and a fuel tank) and an electric traction chain (with an electric motor and a traction battery that can notably be set to charge at a current outlet).

Such a hybrid vehicle can be driven just by its electric traction chain, or just by its thermal traction chain, or even simultaneously by both its electric and thermal traction chains.

Without knowledge of the future journey of the vehicle, the strategy currently implemented to use one or other of the traction chains consists in systematically beginning by discharging the traction battery at the start of the journey until a minimal energy level is reached, then in using the thermal traction chain. In this way, when the driver performs short journeys and he or she regularly has the possibility of recharging the traction battery, he or she uses the electric traction chain to the maximum, which reduces the polluting emissions of the vehicle.

This strategy does not however always guarantee a minimal fuel consumption when the length of the journey exceeds the electric range of the vehicle. It is notably the case when the user begins a journey with a part on a motorway and ends it with a part in town. In fact, the use of the electric traction chain on a motorway, at high power, is unsuitable because the electric losses are high, and the use of the thermal traction chain is unsuitable in town because the efficiency of the internal combustion engine is lower in a town than on a motorway.

Moreover, the legislation sometimes prohibits the use of the internal combustion engine in certain urban zones (called "zero-emission zones"), which prohibition may be permanent or temporary, for example in the case of alternating traffic systems. It is then understood that the driver no longer has access to these zero-emission zones if the traction battery of his or her vehicle is discharged.

In order to overcome this drawback, the document U.S. Pat. No. 9,108,503 proposes identifying the next zero-emission zone on the journey that the driver wants to make, and ensuring an "all-electric" operation of the vehicle (that is to say not using the internal combustion engine) on arrival at this zone.

One drawback of this method is that it does not make it possible to ensure an all-electric operation of the vehicle over all the zero-emission zones of the journey. Thus, if two zero-emission zones are situated in proximity to one another, the method described does not make it possible to ensure that the vehicle can run in "all-electric" mode in the second zone.

Another drawback is that this method is not designed to best reduce the fuel consumption of the vehicle over all of the journey.

SUBJECT MATTER OF THE INVENTION

In order to remedy the abovementioned drawbacks of the prior art, the present invention proposes a method for calculating a management setpoint for the consumption of fuel and electric current by a hybrid motor vehicle, which comprises steps of:
- a) acquisition, by means of a navigation system, of a journey to be made,
- b) division of said journey into successive sections,
- c) acquisition, for each section, of attributes characterizing said section, a first of said attributes acquired relating to whether or not use of the internal combustion engine is authorized in said section,
- d) for each of said sections and given its attributes, acquisition of a relationship linking the fuel consumption of the hybrid motor vehicle the section to its electrical energy consumption,
- e) determination of an optimal consumption point in each of the relationships acquired so as to:
  - maximize the discharge of the traction battery in the sections for which the first attribute indicates that use of the internal combustion engine is not authorized,
  - minimize the fuel consumption of the hybrid motor vehicle over all of the journey, and
  - maximize the discharge of the traction battery at the end of said journey, and
- f) creation of an energy management setpoint throughout the journey, based on the coordinates of said optimal points.

Thus, by virtue of the invention, there can be an assurance that the vehicle will be able to run in "all-electric" mode over the maximum of zero-emission zones in its journey, given the capacity of its traction battery and its charge level at the start of the journey. The invention also makes it possible to minimize the fuel consumption over the entire journey, so as to reduce as much as possible the polluting emissions released into the atmosphere.

Other advantageous and nonlimiting features of the method according to the invention are as follows:
- in the step f), the energy management setpoint comprises a command to inhibit the starting of the internal combustion engine on the sections for which the first attribute indicates that use of the internal combustion engine is not authorized;
- in the step e), provision is made to determine the optimal consumption points by penalizing the points of the relationships which correspond to a non-zero fuel consumption on the sections for which the first attribute indicates that use of the internal combustion engine is not authorized;

in the step e), the determination of the optimal consumption points is made by means of a heuristic optimization algorithm;

the heuristic optimization algorithm consisting in minimizing a function which is the sum of a cost function to reach the section considered and of a heuristic function evaluating the remaining cost to go from the section considered to the end of the journey, in order to penalize the points of the relationships which correspond to a non-zero fuel consumption on the sections for which the first attribute indicates that use of the internal combustion engine is not authorized, the calculation of the heuristic function is performed differently on the sections for which the first attribute indicates that use of the internal combustion engine is not authorized and on the other sections;

the calculation of the heuristic function is performed by using a mathematical expression to which there is applied a multiplying coefficient which is strictly greater than 1 on the sections for which the first attribute indicates that use of the internal combustion engine is not authorized and which is equal to 1 on the other sections;

in the step d), each relationship is acquired by selecting, from a plurality of predetermined relationships linking fuel consumption values to electrical energy consumption values, the predetermined relationship which is the best approximation of the relationship linking the fuel consumption of the hybrid motor vehicle on the section to its electrical energy consumption given the attributes characterizing said section;

the predetermined relationships are curves or maps linking fuel consumption values of the internal combustion engine to charge or discharge values of the traction battery;

with a memory storing the predetermined relationships and a table associating with each attribute value a probability that the section is associated with one or other of the predetermined relationships, in the step d), provision is made, for each section, to determine, using said table, given the values of the attributes associated with this section, the sum of the probabilities that the section belongs to one or other of the predetermined relationships, and to select the relationship having the highest probability sum;

in the step b), each section is defined as being a portion of maximum length of the journey which comprises at least two attributes that are invariable over all its length, one of the two attributes being formed by the first attribute.

DETAILED DESCRIPTION OF AN EXEMPLARY EMBODIMENT

The description which follows, with reference to the attached drawings, given as nonlimiting examples, will give a good understanding of what the invention consists of and how it can be produced.

In the attached drawings:

FIG. 1 is a table illustrating the values of attributes characterizing sections of a journey that a vehicle must make;

FIG. 2 is a table illustrating the parameters of reference curves characterizing the sections of the journey to be made;

FIG. 3 is a graph illustrating the distribution of specific consumption curves acquired in test runs;

Figures 4, 5:
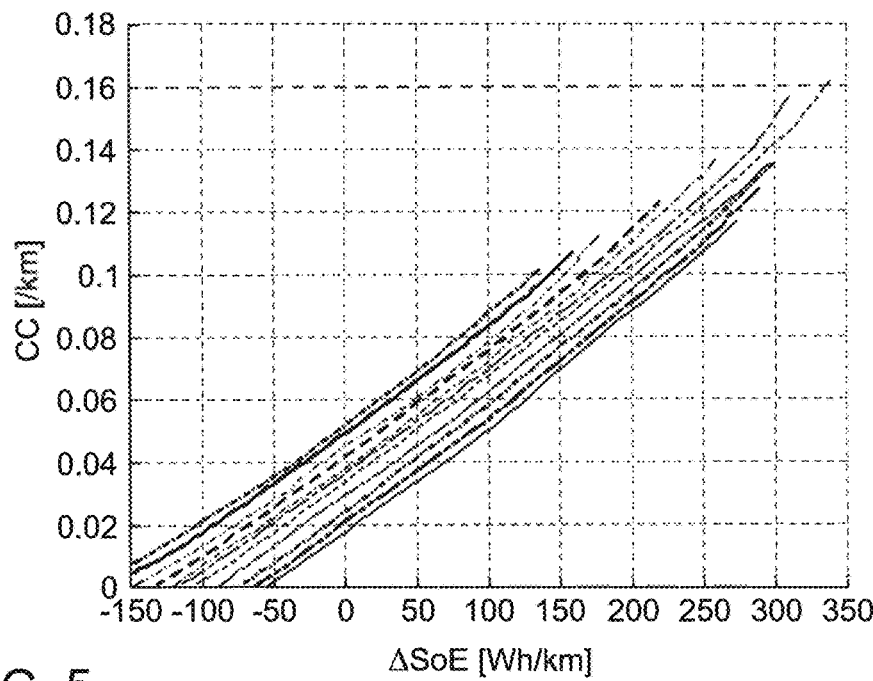
FIG. 4 is a graph illustrating several reference curves.
FIG. 5 is a table associating, with each attribute value assigned to a section, a probability that this section is associated with one or other of the reference curves of FIG. 4.

Conventionally, a motor vehicle comprises a chassis which notably supports a power chain, bodywork elements and vehicle interior elements.

In a rechargeable hybrid vehicle, the power train comprises a thermal traction chain and an electric traction chain.

The thermal traction chain notably comprises a fuel tank and an internal combustion engine supplied with fuel by the tank.

The electric traction chain, for its part, comprises a traction battery and one or more electric motors supplied with electric current by the traction battery.

The motor vehicle here also comprises a current outlet that makes it possible to locally charge the traction battery, for example on the electrical network of a residence or on any other electrical network.

The motor vehicle also comprises auxiliary devices, which are here defined as electrical devices supplied with current by the traction battery.

Auxiliary devices that can be cited include the air conditioning motor, the motors of the electric windows, or even the geolocation and navigation system.

This geolocation and navigation system conventionally comprises an antenna making it possible to receive signals relating to the geolocated position of the motor vehicle, a memory making it possible to store a map of a country or of a region, and a screen making it possible to show the position of the vehicle on this map.

Here, the case will be considered in which this screen is a touch screen to allow the driver to input information thereon. It could obviously be otherwise.

Finally, the geolocation and navigation system comprises a controller making it possible to calculate a journey to be made given information input by the driver, the map stored in its memory and the position of the motor vehicle.

The motor vehicle 1 also comprises an electronic control unit (or ECU), here called computer, notably making it possible to control the abovementioned two traction chains (notably the powers developed by the electric motor and by the internal combustion engine).

In the context of the present invention, this computer is connected to the controller of the geolocation and navigation system, so that these two elements can have information communicated to them.

Here, they are connected together by the main inter-unit communication network of the vehicle (typically by the CAN bus).

The computer comprises a processor and a storage unit (hereinafter called memory).

This memory stores data used in the context of the method described hereinbelow.

It notably stores a table of the type illustrated in FIG. 5 (which will be detailed later in this description).

It also stores a computer application, consisting of computer programs comprising instructions, the execution of which by the processor allows the method described hereinbelow to be implemented by the computer.

By way of introduction, several concepts used in the description of the method described hereinbelow are defined here.

Thus, the term "journey" can be defined as being a path that the motor vehicle must take from a departure station to arrive at a destination station.

This destination station, the aim of the journey, will be considered to be equipped with a charging station making it possible to recharge the traction battery via the current outlet with which the vehicle is equipped.

Each journey may be subdivided into "adjacent segments" or into "adjacent sections".

The concept of segments will be that inherently used by the controller with which the geolocation and navigation system is equipped.

In practice, each segment corresponds to a part of the journey which extends between two road intersections. To define the shortest or fastest journey, the controller will therefore determine the road segments through which the journey must pass.

The concept of sections is different. It will be clearly detailed below in this description. To simplify, each section of the journey corresponds to a part of the journey on which the characteristics of the road do not substantially change. As an example, the journey could be subdivided into several sections on each of which the maximum authorized speed is constant.

These sections are characterized by parameters that are here called "attributes". Examples of attributes that make it possible to characterize each section are as follows.

A first attribute will be the "road category FC". The controllers with which the geolocation and navigation systems are equipped generally use this type of category to distinguish the different types of roads. Here, this category may take an integer value between 1 and 6. An attribute equal to 1 may correspond to a motorway, an attribute equal to 2 may correspond to a national road, etc.

A second attribute will be the "slope RG" of the section, expressed in degrees or as a percentage.

The third, fourth, fifth and sixth attributes will relate to characteristic speeds of the vehicles using the section.

The third attribute will be the "speed category SC" of the section. The controllers with which the geolocation and navigation systems are equipped generally also use this type of category to distinguish the different types of roads. Here, this category may take an integer value of between 1 and 6. An attribute equal to 1 may correspond to a very high speed road (greater than 120 km/h), an attribute equal to 2 may correspond to a high speed road (between 100 and 120 km/h), etc.

The fourth attribute will be the "maximum speed limit SL" on the section.

The fifth attribute will be the "average speed SMS" observed over the section (whose value is derived from statistical measurement performed on each road).

The sixth attribute will be the "instantaneous speed TS" observed on the section (whose value is derived from a real time traffic status information system).

The seventh attribute will be the "length LL" of the section.

The eighth attribute will be the "average bend radius LC" of the section.

The ninth attribute will be the "number of lanes NL" of the section in the direction of travel taken by the vehicle.

The tenth attribute will relate to whether or not use of the internal combustion engine is authorized in the section considered. The tenth attribute will be called "zero-emission ZE". Here it will be a boolean equal to 0 if use of the internal combustion engine is authorized on the section considered, and equal to 1 otherwise.

In the following description, these ten attributes will be used to characterize each section of the journey.

As a variant, each section of the journey may be characterized by a lesser or greater number of attributes, the use of the tenth attribute however being unavoidable.

Also, the state of energy SOE of the traction battery will be defined as being a parameter that makes it possible to characterize the energy remaining in this traction battery. As a variant, another parameter may be used, such as the state of charge SOC of the battery or any other parameter of the same type (internal resistance of the battery, voltage at the terminals of the battery, etc.).

The charge or discharge ΔSOE of the traction battery will then be considered equal to the difference between two states of energy considered at two distinct moments.

The "specific consumption curve" of the vehicle over a section considered is then defined as being a curve which associates with each fuel consumption value CC of the vehicle, a traction battery charge or discharge value ΔSOE. In fact, on a determined section, it is possible to estimate what the fuel consumption CC of the vehicle will be (in liters per kilometer traveled) and what the charge or discharge ΔSOE of the traction battery will be (in watt hours per kilometer). These two values will be linked by a curve, since they vary depending on whether the electric traction chain or the thermal traction chain will be used more to advance the vehicle.

Since there is an infinity of different situations (slope, speed, etc.), there is also an infinity of specific consumption curves. The "reference curves" are thus defined as being particular specific consumption curves, the characteristics of which will be well known and which will make it possible to approximate each specific consumption curve. In other words, as will emerge more clearly hereinbelow in this explanation, each section of journey will have associated with it not a specific consumption curve but rather a reference curve (that which will constitute the best approximation of the specific consumption curve).

The method, which is implemented jointly by the controller of the geolocation and navigation system and by the computer of the vehicle, is a method for calculating a management setpoint for the consumption of fuel and electric current by the vehicle.

This method consists more specifically in determining how, on a predefined journey, the electric traction chain and the thermal traction chain must be used so as to:

best reduce the fuel consumption of the vehicle and its polluting emissions, and to ensure an "all-electric" mode of operation of the vehicle (that is to say not using the internal combustion engine) on sections for which the "zero-emission ZE" attribute is equal to 1.

For that, the method comprises the following six main steps:

acquisition of a journey to be made, division of said journey into successive adjacent sections $T_i$, acquisition, for each section $T_i$, of attributes FC, SC, SL, TS, RG, LL, NL and SMS characterizing this section $T_i$, determination, for each of the sections $T_i$, given the attributes FC, SC, SL, TS, RG, LL, NL, SMS of this section $T_i$, of a relationship (here called reference curve $CE_j$) linking each fuel consumption value CC of the hybrid motor vehicle on the section to a traction battery charge or discharge value $\Delta$SOE, determination of an optimal point $P_i$ of each reference curve $CE_1$ that makes it possible to minimize the fuel consumption of the hybrid motor vehicle over all of the journey and obtain a complete discharge of the traction battery at the end of said journey, while ensuring an "all-electric" mode of operation on the sections for which the "zero-emission ZE" attribute is equal to 1, and creation of an energy management setpoint based on the coordinates of said optimal points $P_i$.

These six successive steps are detailed below in this explanation.

The first step consists in acquiring the journey that the motor vehicle must make.

This step may be carried out by the controller embedded in the geolocation and navigation system.

This step is then implemented in a conventional manner.

Thus, when the driver uses the touch screen of the geolocation and navigation system to define a destination station, the controller of this system calculates the journey to be made, based notably on the routing parameters selected by the driver (fastest journey, shortest journey, etc.).

At this stage, it may be noted that the method will have to be reinitialized when the vehicle makes a journey that is different from that defined by the geolocation and navigation system.

As a variant, this first step may be performed otherwise.

Thus, it will be possible to dispense with the input by the driver of the destination station on the touch screen. For that, the controller may detect the habits of the driver and automatically deduce therefrom the destination station.

For example, when the driver makes the same journey each day of the week to go to work, this journey can be automatically acquired without the driver having to input any information on the touch screen of the geolocation and navigation system.

At the end of this first step, the controller embedded in the geolocation and navigation system knows the journey of the vehicle, which is then composed of a plurality of adjacent segments, which, it will be recalled, each extend between two road intersections.

The second step consists in dividing the journey into sections $T_i$.

The benefit of re-dividing the journey not into segments but into sections is first of all to reduce the number of subdivisions of the journey. In fact, it is commonplace for the attributes of two successive segments to be identical. If these two successive segments were to be treated separately, the duration of the calculations would be unnecessarily multiplied. By combining these identical segments within one and the same section, it will be possible to reduce the duration of the calculations.

Another benefit is that the characteristics of the road on one and the same segment can vary substantially (one part of the segment may correspond to a road with zero slope and another part of this segment may correspond to a road with a steep slope). Here, the aim is to divide the journey into sections, on each of which the characteristics of the road are uniform.

Each section $T_i$ will be defined here as being a portion of the journey which comprises at least one attribute that is invariable over all of its length.

This attribute may consist of the slope RG and/or the speed category SC and/or the road category FC.

Each section $T_i$ will also be defined in such a way that the "zero-emission ZE" attribute is invariable over all of its length.

Here, this second step will be implemented by the controller embedded in the geolocation and navigation system. It will to this end subdivide the journey into sections $T_i$ of maximum lengths in which the abovementioned four attributes (RG, SC, FC, zero-emission ZE) are constant.

At the end of this second step, the controller has thus defined N sections (the index i therefore varying from 1 to N).

The third step consists in acquiring the attributes of each section $T_i$.

When one of the attributes is variable over the section considered, it is the average value of this attribute over all of the section which will be considered.

In practice, this third step is performed as follows.

First of all, the controller embedded in the geolocation and navigation system informs the computer that a new journey has been calculated. The computer then asks for the attributes of each section to be sent, in the form for example of a table of the type illustrated in FIG. 1.

The controller then acquires the attributes of each section as follows.

It calculates a part thereof, notably the length LL of the section.

It reads another part thereof in the memory of the geolocation and navigation system, notably the road category FC, the slope RG, the speed category SC, the speed limit SL, the average speed SMS, the mean bend radius LC and the number of lanes NL.

A last part of these attributes is communicated to it by another device, notably the instantaneous speed TS that the real time traffic status information system communicates to it.

The "zero-emission ZE" attribute can, for its part, either be read in the memory of the geolocation and navigation system (for the zones where the law permanently prohibits the use of the internal combustion engine), or be communicated by another device (for example communicated by a radio station adapted to emit radio signals indicating the zones where the law currently prohibits the use of the internal combustion engine). It is also possible to provide for the user to him or herself choose zones of the journey in which he or she does not want to allow the use of the internal combustion engine.

The controller then transmits all of this information to the main computer of the vehicle, via the CAN bus.

The advantage of using the controller embedded in the geolocation and navigation system rather than the main computer of the vehicle to carry out the first three steps is to reduce the quantity of information to be transmitted to the computer by the CAN bus. In fact, by merging the adjacent segments of the journey which have the same attributes, the volume of data transmitted is reduced, which speeds up the transmission of the data by the CAN bus.

On reception of the information, the computer implements the following steps.

The fourth step thus consists, for each of the sections $T_i$, in determining, from among the reference curves $CE_j$ stored in the memory of the computer, that which will make it possible to best estimate the energy consumption (fuel and current) of the vehicle on the section $T_i$ considered.

This step thus makes it possible to switch from a characterization of each section by attributes to a characterization by an energy cost.

During this fourth step, the computer will use the table TAB illustrated in FIG. 5, which is stored in its memory.

As this FIG. 5 shows, this table TAB has rows which each correspond to a value (or to a range of values) of one of the attributes. It has columns each corresponding to one of the reference curves $CE_j$. In the example illustrated, it will be considered that the memory of the computer stores M reference curves $CE_j$, with M equal here to eleven.

In FIG. 5, the cells of the table TAB are left empty since the values that they will contain will depend on the characteristics of the vehicle.

In practice, this table TAB will be stored in the memory of the computer with values in each of these cells.

These values will be probability values (lying between 0 and 1) corresponding to the probability that each attribute value corresponds to one or other of the reference curves $CE_j$.

As an example, if the road category FC of a section $T_i$ has a value equal to 2, it can be read in the table that the probability that this section is indeed characterized in terms of energy cost by the reference curve CE1 is equal to $a_1$, that the probability that this section is indeed characterized in terms of energy cost by the reference curve CE2 is equal to $a_2$, and so on.

It will be noted hereinbelow that the values of the attributes "slopes RG", "length LL" and "zero-emission ZE" have not, by design, been used in this table TAB.

At this stage, the computer can then note down each probability value corresponding to the value of each attribute of the section $T_i$ considered.

In the example illustrated, where it is considered that the attribute FC is equal to 2, that the attribute SC is equal to 6, that the attribute SL is equal to 30, that the attribute NL is equal to 2, that the attribute SMS lies between 60 and 80 and that the attribute TS lies between 40 and 60, the computer notes down the values denoted $a_1$ to $a_{11}$, $b_1$ to $b_{11}$, $c_1$ to $c_{11}$, $d_1$ to $d_{11}$, $e_1$ to $e_{11}$ and $f_1$ to $f_{11}$.

The computer then adds up the probabilities that the section $T_i$ considered is indeed characterized in terms of energy cost by each of the eleven reference curves $CE_j$.

In the example illustrated, the computer to this end adds up the values denoted $a_1$ to $f_1$, then $a_2$ to $f_2$, and so on.

Finally, the computer determines which of the eleven sums gives the highest result.

Thus, it considers that the reference curve $CE_j$ with which this high probability sum is associated is that which best characterizes the section $T_i$ in terms of energy cost.

The computer can then acquire, in its memory, the values of the parameters characterizing this reference curve $CE_j$.

At this stage of the explanation, it is worth focusing more specifically on the way in which these reference curves are obtained and modeled.

For each vehicle model (or for each engine model, or for each set of car models, or for each set of engine models), it is necessary to perform a large number of test runs (or of test run simulations) on different geolocated road sections.

These test runs make it possible to determine the fuel and electric current consumption of the vehicle on different sections whose attributes are known. For that, the vehicle is made to move several times over each section, each time increasing the share of the traction developed by the electric motor.

It is then possible to generate a specific consumption curve CCS for each section. These specific consumption curves are of the type of the curves illustrated in FIG. 4.

On each of these curves, it can be observed that the more use there is made of the electrical energy (i.e. an $\Delta SOE<0$), the more the fuel consumption lowers until it reaches 0 in a run exclusively using the electric traction chain. Conversely, the greater the effort to recharge the battery via the heat engine ($\Delta SOE>0$), the more the fuel consumption increases. Finally, it will be recalled that each specific consumption curve CCS describes the average energy consumption of the vehicle for the situation of a run on a horizontal road (zero slope), without electrical consumption by the auxiliary devices.

These test runs make it possible to find as many specific consumption curves CCS as there are sections tested.

Each specific consumption curve CCS can be modeled by a second order polynomial for which the charge and discharge variations $\Delta SOE$ of the traction battery are bounded between a minimum threshold $\Delta SOE_{min}$ and a maximum threshold $\Delta SOE_{max}$, which can be written as follows:

$$\begin{cases} m_{FC} = \Psi_2.\Delta SoE^2 + \Psi_1.\Delta SoE + \Psi_0 \\ \Delta SoE \in [\ \Delta SoE\text{min} \quad \Delta SoE\text{max}\ ] \end{cases}$$

with $\Psi_0$, $\Psi_1$, $\Psi_2$ the coefficients of the polynomial.

As the curves of FIG. 4 show, to simplify this modeling, it can be estimated that the two coefficients $\Psi_1$, $\Psi_2$ are identical from one curve to another. It can also be observed that the minimum threshold $\Delta SOE_{min}$ depends on the three coefficients of the polynomial. Thus, only the coefficient $\Psi_0$ and the maximum threshold $\Delta SOE_{max}$ vary. It is therefore these two values which make it possible to characterize each specific consumption curve CCS.

FIG. 3 then illustrates points whose coordinates correspond to these two variables $\Psi_0$ and $\Delta SOE_{max}$. It shows the distribution of the specific consumption curves CCS obtained in the test runs made. Here, it is considered that these points are distributed in eleven distinct zones. Each zone is then defined by its barycenter.

Thus, as was explained above, in the method, rather than acquiring the specific consumption curve which would correspond exactly to the section considered, it is one of the eleven reference curves for which the variables $\Psi_0$ and $\Delta SOE_{max}$ correspond to the barycenter of one of these eleven zones which is considered.

At this stage of the method, each section $T_i$ is then defined, as FIG. 2 shows, by the abovementioned parameters $\Psi_0$, $\Psi_1$, $\Psi_2$, $\Delta SOE_{min}$, $\Delta SOE_{max}$, and by the length $LL_i$ of each section $T_i$, by its slope $RG_i$, and by the "zero-emission ZE" attribute.

As was explained above, the selected energy curve $CE_i$ does not take account of the slope of the section $T_i$, or of the electric current consumption of the auxiliary devices (air-conditioning motor, etc.), or of whether or not use of the internal combustion engine is authorized on the section considered.

In order to take account of the slope of each section $T_i$, a step of correction of each reference curve $CE_i$ based on the slope $RG_i$ is provided.

Figure 7:
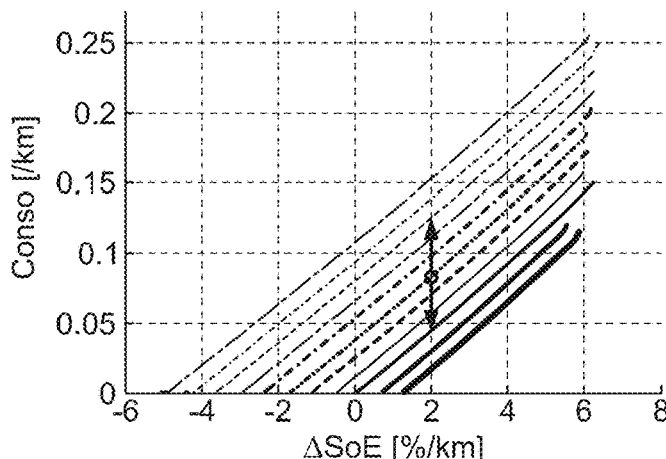
FIG. 7 is a graph illustrating the corrections to be made to a reference curve, taking account of the slope of the section of the corresponding journey.

As FIG. 7 clearly shows, this correction step consists simply in shifting the reference curve $CE_i$ associated with the section $T_i$ upward or downward (that is to say with constant charge or discharge $\Delta SOE$), by a value that is a function of the slope $RG_1$.

It is in fact understood that when the road section considered rises, the fuel consumption will be higher than that initially planned. On the other hand, when the road section considered descends, the fuel consumption will be less high than that initially planned.

Furthermore, during braking phases, it will be possible to harvest more electrical energy when descending than when climbing.

In practice, the correction step will consist in correcting the parameter $\Psi_0$ according to the following formula:

$$\Psi_0' = \Psi_0 + K.RGi,$$

with K a coefficient in the value depends on the vehicle model considered and its characteristics (as an example, it will be possible here to consider $K=0.01327 \ 1{\cdot}km^{-1}$).

In order to take account of the electric current consumption of the auxiliary devices, a second step of correction of each reference curve $CE_i$ as a function of the electrical power $P_{aux}$ consumed by these auxiliary devices is provided.

It will be noted here that the electrical power value $P_{aux}$ considered is the value which can be measured at the time of the calculations. In this method, it is therefore assumed that the electrical power consumed will remain substantially constant over the journey. If the computer were to detect a great variation in this electrical power over a long period (for example because the air-conditioning has been started up), it could be programmed to recommence the method at this step in order to take account of the new electrical power value $P_{aux}$.

More specifically, the method could be reinitialized at this second correction step if the difference between the electrical power considered in the calculations and that measured were to remain above a threshold (for example 10%) for a duration exceeding a threshold (for example 5 minutes).

Figure 6:
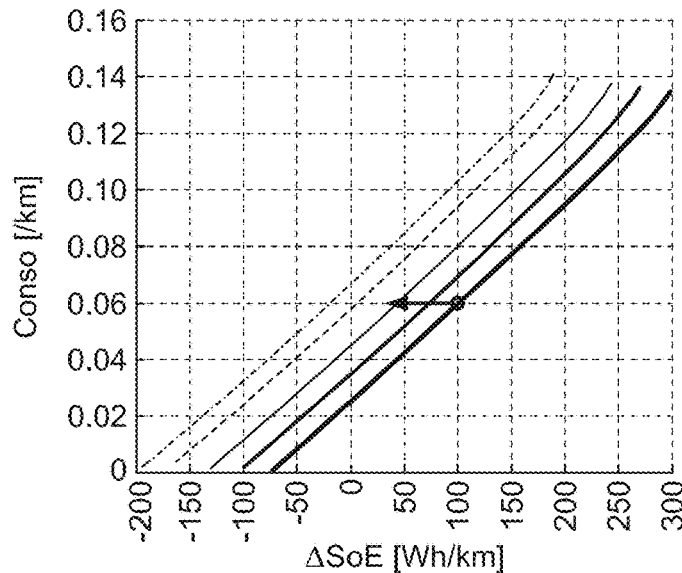
FIG. 6 is a graph illustrating the corrections to be made to a reference curve, taking account of the electrical consumption of auxiliary devices of the vehicle.

As FIG. 6 clearly shows, the second correction step consists simply in shifting the reference curve $CE_i$ associated with the section $T_i$ to the left (that is to say with constant fuel consumption), by a value that is a function of the electrical power $P_{aux}$.

It is in fact understood that when the electrical devices are used, the charge of the battery will be slower than planned and the discharge of this battery will be faster than planned.

In practice, the correction step will consist in shifting the reference curve $CE_j$ by a value $E_{AUX}$ calculated from the following formula:

$$E_{AUX} = \frac{P_{AUX}}{\overline{v}}$$

in which $\overline{v}$ represents the average speed over the section (in km/h). This value can be supplied directly by the geolocation and navigation system, estimating that it will be equal to the traffic speed value or to the statistical average speed or to the speed limit.

The fifth step of the method then consists in determining, on each reference curve $CE_j$, the optimal point $P_i$ which will make it possible to minimize the fuel consumption of the hybrid motor vehicle over all of the journey and obtain a complete discharge of the traction battery at the end of said journey, while observing the constraint defined by the "zero-emission ZE" attribute.

This step could be performed by means of any algorithm (quadratic programming, dynamic programming, etc.).

It is performed here by means of a heuristic optimization algorithm, for example of the type A*. This is an algorithm which is known in the prior art and which will not therefore be described here in detail. Its operation can however be briefly explained.

For that, reference will be made to FIG. 8.

It can be seen therein that, for each section, a series of points is plotted passing through states of energy SOE parallel to the y axis, with an x axis equal (in kilometers) to the distance between the departure station and the final point of the section. Each point of this line corresponds to a state of energy SOE that is achievable deduced from the reference curve $CE_1$ associated with this section. The spacing of the states of energy SOE is discretized as a finite number of points.

The ordinate of each point is then equal to the energy state SOE of the traction battery that would remain at the end of the section if the vehicle were driven according to the corresponding point of the reference curve $CE_j$, given the charge or discharge applied to the traction battery.

Each point therefore constitutes a node $n_{i,x}$ (the index i corresponding to the section $T_i$ considered and the index x corresponding to the energy state SOE of the traction battery at the end of the section $T_i$ considered).

The objective of the algorithm A* is thus to find the path CI which will make it possible to minimize the fuel consumption of the vehicle while respecting the zero-emission zones of the journey.

The choice of the order of exploration of the nodes $n_{i,x}$ is determined while trying to minimize a function f which is the sum of a cost function g and of a heuristic function h, as the following formula shows:

$$f(n_{i,x}) = g(n_{i,x}) + h(n_{i,x})$$

in which the cost function g represents the quantity of fuel needed to arrive at the node n from the initial node (start of the journey) over the best available route based on the choices relating to charge or discharge $\Delta SOE$ to be applied to the battery in the preceding sections, and in which the heuristic function h represents an optimistic estimation of the quantity of fuel remaining to be consumed with a charge or discharge $\Delta SOE$ which could be applied to the traction battery to go from the node n to the final node, considering the case of a linear discharge of the traction battery from the node n.

These two expressions can be expressed as a function of the position of the section considered along the journey (expressed here by a curvilinear abscissa $d_i$) and of the energy level $SOE_x$ considered of the traction battery at the end of the section $T_i$.

The cost function g can thus be expressed, to represent the cost of a transition from a node $n_{i,x}$ (defined by a curvilinear abscissa $d_i$ and by an energy level $SOE_x$) to a node $n_{i+1,y}$ (defined by a curvilinear abscissa $d_{i+1}$ and by an energy level $SOE_y$) by the expression:

$$g(n_{i,x}, n_{i+1,y}) =$$

-continued $$(d_{i+1} - d_i) * \left[ \psi_{i,2} \left( \frac{SOE_y - SOE_x}{d_{i+1} - d_i} \right)^2 + \psi_{i,1} \left( \frac{SOE_y - SOE_x}{d_{i+1} - d_i} \right) + \psi_{i,0} \right]$$

The heuristic function h of the node $n_{i,x}$ can, for its part, be expressed by the expression:

$$h(n_{i,x}) =$$

$$\sum_{j=i}^{N} \alpha_i^{ZE} * (d_{j+1} - d_j) * \left[ \psi_{j,2} \left( \frac{SOE_c - SOE_x}{d_N - d_i} \right)^2 + \psi_{j,1} \left( \frac{SOE_c - SOE_x}{d_N - d_i} \right) + \psi_{j,0} \right]$$

in which the destination station is situated at the node $n_N$ (defined by a curvilinear abscissa $d_N$ and by an energy level $SOE_c$), and in which the multiplying coefficient $\alpha_i^{ZE}$ will be defined later.

The function f allows the algorithm to explore, on each calculation step, the route which both minimizes the cost to arrive at the current node while also minimizing the cost remaining from this node to the end of the journey.

Thus, the use of the function f urges this algorithm to explore the routes closest to the optimal route, which limits the exploration of sub-optimal routes and which makes it possible to obtain good results in a minimum of computation time.

According to the present invention, the function f is parameterized so as to ensure an "all-electric" mode of operation on the sections where the "zero-emission ZE" attribute is equal to 1.

For that, the computer of the motor vehicle implements three distinct operations.

The first two operations are provided to assign the operation of the algorithm A* while the third operation is provided to act directly on the internal combustion engine.

The first operation consists, for the sections $T_i$ where the "zero-emission ZE" attribute is equal to 1, in forcing the use of the nodes $n_{i,x}$ which maximize the discharge of the traction battery.

For that, if the section $T_i$ considered has a "zero-emission ZE" attribute equal to 1, the algorithm A* is provided to be able to choose only a single node $n_{i+1,y}$ such that:

$$SOE_y = SOE_x + \Delta SOE_{i,min}$$

in which $\Delta SOE_{i,min}$ represents the electrical consumption in "all-electric" mode of the vehicle on the section $T_i$ (between the nodes $n_{i,x}$ and $n_{i+1,y}$).

The second operation consists in applying penalties in the calculation of the heuristic function h to all the routes which would result in a fuel consumption over the section $T_i$ so as to make that route less advantageous from the point of view of the algorithm.

This second operation thus makes it possible to improve the rate of convergence of the algorithm A*.

The penalty is modeled here by the abovementioned multiplying coefficient $\alpha_i^{ZE}$.

For that, this multiplying coefficient is chosen such that:
$\alpha_i^{ZE}=1$ on the sections for which the "zero-emission ZE" attribute is equal to 0,
$\alpha_i^{ZE}=A>1$ on the sections for which the "zero-emission ZE" attribute is equal to 1, A being a predetermined constant.

It will be noted here that it is advantageous to implement this second operation, but that the latter is not absolutely necessary to ensure that the vehicle runs in all-electric mode on the sections for which the "zero-emission ZE" attribute is equal to 1.

Once the optimal path is found (passing through the optimal points of the reference curves $CE_j$), the computer creates an energy management setpoint based on the coordinates of the optimal points $P_i$.

Figure 8:
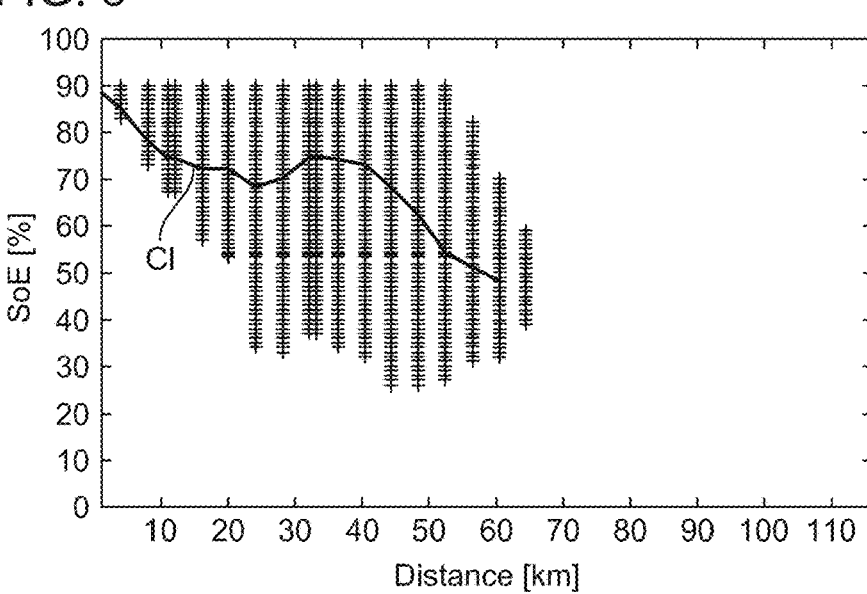
FIG. 8 is a graph illustrating different points for each reference curve associated with each section and a curve passing through the optimal points of these reference curves.

This energy management setpoint is then used during the journey by the computer in order to follow the route, so that the energy state SOE of the traction battery follows the path CI illustrated in FIG. 8.

Several methods make it possible to perform such route following. One example is notably well illustrated in the patent application FR2988674 filed by the applicant, or in the documents WO2013150206 and WO2014001707.

The third operation consists in creating the energy management setpoint so that it includes an inhibition signal that inhibits the starting of the internal combustion engine on the sections for which the "zero-emission ZE" attributes are equal to 1.

The inhibition signal is then transmitted to the computer which therefore prevents any starting of the internal combustion engine on these sections.

At this stage, it may be noted that it is possible that no energy management setpoint may be found so as to ensure passage through sections in which the use of the internal combustion engine is not authorized, either because the traction battery will not be sufficiently charged on arrival on these sections, or because the zero-emission zone passed through is too big given the range of the hybrid vehicle in "all-electric" mode.

In this eventuality, the computer will be designed to alert the driver, for example via a screen situated in the central console of the vehicle, to the fact that passing through such sections will be impossible. The computer may then propose another journey that does not have this problem.

The invention claimed is:

1. A method of calculating a management setpoint for fuel consumption and of electric current by a hybrid motor vehicle comprising at least one electric motor supplied with electric current by a traction battery, and an internal combustion engine supplied with fuel, the method comprising:
a) acquiring, by a navigation system, a journey to be made,
b) dividing said journey into successive sections,
c) acquiring, for each section, attributes characterizing said section,
d) acquiring, for each of said sections and the attributes, a relationship linking the fuel consumption of the hybrid motor vehicle in the section to electrical energy consumption,
e) determining an optimal consumption point in each of the relationships acquired,
f) creating an energy management setpoint throughout the journey, based on coordinates of said optimal points, and
g) operating the at least one electric motor and the internal combustion engine according to the energy management setpoint,
wherein, in c), a first of said attributes acquired relates to whether or not use of the internal combustion engine is authorized in said section,
wherein, in e), the determining includes determining the optimal consumption points so as to:

maximize a discharge of the traction battery in the sections for which the first attribute indicates that use of the internal combustion engine is not authorized, minimize the fuel consumption of the hybrid motor vehicle over all of the journey, and maximize the discharge of the traction battery at an end of said journey, wherein, in e), the determining includes determining the optimal consumption points by penalizing the points of the relationships which correspond to a non-zero fuel consumption on the sections for which the first attribute indicates that use of the internal combustion engine is not authorized by a heuristic optimization algorithm, and the heuristic optimization algorithm includes minimizing a function which is a sum of a cost function to reach the section considered and a heuristic function evaluating the remaining cost to go from the section considered to the end of the journey, in order to penalize the points of the relationship which correspond to a non-zero fuel consumption on the sections for which the first attribute indicates that use of the internal combustion engine is not authorized, the calculation of the heuristic function is performed differently on the sections for which the first attribute indicates that use of the internal combustion engine is not authorized and on the other sections.

2. The calculation method as claimed in claim 1, wherein, in f), the energy management setpoint comprises a command to inhibit starting of the internal combustion engine on the sections for which the first attribute indicates that use of the internal combustion engine is not authorized.

3. The calculation method as claimed in claim 1, wherein the calculation of the heuristic function is performed by using a mathematical expression to which there is applied a multiplying coefficient which is strictly greater than 1 on the sections for which the first attribute indicates that use of the internal combustion engine is not authorized and which is equal to 1 on the other sections.

4. The calculation method as claimed in claim 1, wherein, in d), each relationship is acquired by selecting, from a plurality of predetermined relationships linking fuel consumption values to electrical energy consumption values, the predetermined relationship that is the best approximation of the relationship linking the fuel consumption of the hybrid motor vehicle on the section to the electrical energy consumption given the attributes characterizing said section.

5. The calculation method as claimed in claim 4, wherein the predetermined relationships are curves or maps linking fuel consumption values of the internal combustion engine to charge or discharge values of the traction battery.

6. The calculation method as claimed in claim 4, wherein, with a memory storing the predetermined relationships and a table associating with each attribute value a probability that the section is associated with one or other of the predetermined relationships, in d), the acquiring includes, for each section:

determining, using said table, given the values of the attributes associated with the section, a sum of the probabilities that the section belongs to one or other of the predetermined relationships, and selecting the relationship having the highest probability sum.

7. The calculation method as claimed in claim 1, wherein, in b), each section is defined as being a portion of maximum length of the journey which comprises at least two attributes that are invariable over all the length of the section, one of the two attributes being formed by the first attribute.

* * * * *